(No Model.)
G. M. DILLARD.
FELLY CLAMP.
No. 314,232. Patented Mar. 24, 1885.
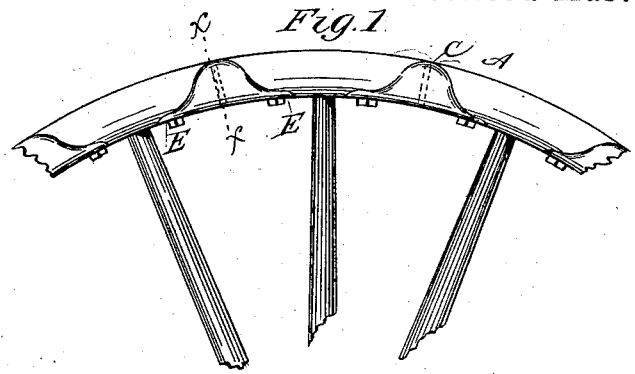
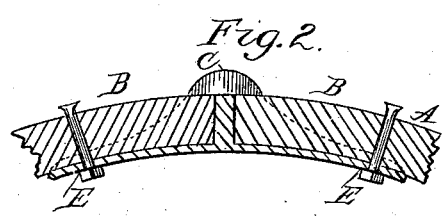
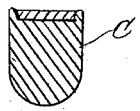
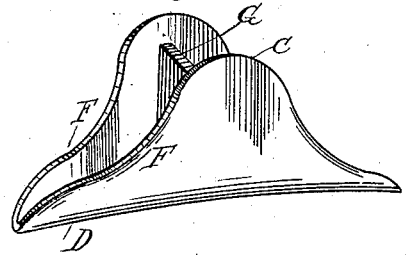
WITNESSES
G. M. Dillard
INVENTOR
by C. A. Snow & Co.
Attorneys

UNITED STATES PATENT OFFICE.

GREGORY M. DILLARD, OF MACON, MISSISSIPPI.

FELLY-CLAMP.

SPECIFICATION forming part of Letters Patent No. 314,232, dated March 24, 1885.

Application filed July 21, 1884. (No model.)

*To all whom it may concern:*

Be it known that I, GREGORY M. DILLARD, a citizen of the United States, residing at Macon, in the county of Noxubee and State of Mississippi, have invented a new and useful Felly-Clamp, of which the following is a specification, reference being had to the accompanying drawings.

This invention relates to felly-clamps for vehicle-wheels, and it has for its object to provide a device of this character which will be simple in its construction and efficient in operation, the main object of the invention being to provide means for securing the sections of the rim or felly together without the use of dowel-pins, as is usually the case, and which will keep the tire from running off should it become loose by constant use.

With these and other objects in view the said invention consists in certain details of construction and combination of parts, as hereinafter set forth, and particularly pointed out in the claims.

In the accompanying drawings, Figure 1 is a side view of a portion of a vehicle-wheel with my improvement applied thereto. Fig. 2 is a longitudinal section of the same, the tire being removed. Fig. 3 is a transverse section on line $x$ $x$, Fig. 1. Fig. 4 is a detail view of the felly-clamp.

Like letters refer to corresponding parts in the several figures.

Referring to the drawings, A designates the felly or rim of an ordinary vehicle-wheel, said felly being formed in sections B B, connected together by my improved clamp, as hereinafter described.

C designates my improved felly-clamp arranged to connect the sections together at their meeting edges, said clamp consisting of the main portion D, adapted to conform to the shape of the felly or rim, and formed with holes E E at their ends, to receive screws or other fastening means to secure the clamp in place. The sides of the main portion D are curved inward to form flanges F F, which embrace the sides of the felly or rim, a cross-bar, G, connecting the flanges and extending down to the main portion D. The flanges F F project above the cross-bar on opposite sides, the tire H fitting between the ends of the flanges, so that should the tire become loose it will be held in place and prevented from running off.

The operation of my invention will be readily understood from the foregoing description, taken in connection with the annexed drawings. The clamp is applied to the sections of the felly or rim at the meeting edges of the sections, and secured in place by screws or other fastening means, the ends of the felly-sections abutting against the cross-bar G, and the tire being secured over the felly-sections between the projecting ends of the side flanges, F, the cross-bar G serving in place of the dowel-pins to hold the sections in place.

By my improved felly-clamp I am enabled to hold the felly-sections together without the use of dowel-pins and recesses or bolts, which is the custom ordinarily employed for this purpose. I thus provide a stronger and neater wheel, which can be manufactured as cheap as the old style, and be much easier repaired.

In place of the holes E at the ends to receive screws, I may provide a hole through the center or cross-bar G for the reception of a bolt and nut. This method of securing the clamp will be found efficient in every respect.

Having described my invention, I claim—

As an improvement in vehicle-wheels, the combination, with the felly or rim formed in sections, of the herein-described felly-clamp and tire-support for securing the meeting edges of the sections together, said clamp consisting of the main portion D, provided with suitable attaching means and curved inward to form flanges F F, which embrace the sides of the felly or rim, and a cross-bar, G, formed integral with and connecting the flanges, but not extending the entire length of the same, so that said flanges will project above the cross-bar on opposite sides, the tire fitting between the projecting ends of the flanges over the cross-bar, for the purpose set forth.

In testimony that I claim the foregoing as my own I have hereto affixed my signature in presence of two witnesses.

GREGORY M. DILLARD.

Witnesses:
T. J. STOKES,
ROBERT C. PATTY.